G. SINCLAIR.
APPARATUS FOR HEATING AND COOLING LIQUIDS.
APPLICATION FILED APR. 18, 1911.
1,017,816.
Patented Feb. 20, 1912.
2 SHEETS—SHEET 1.
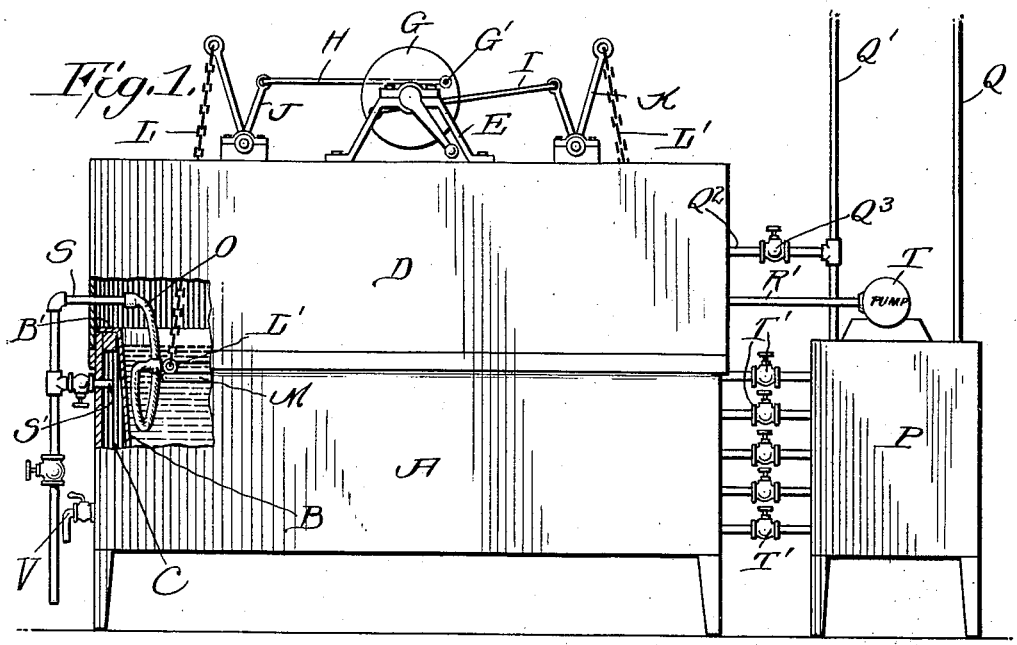
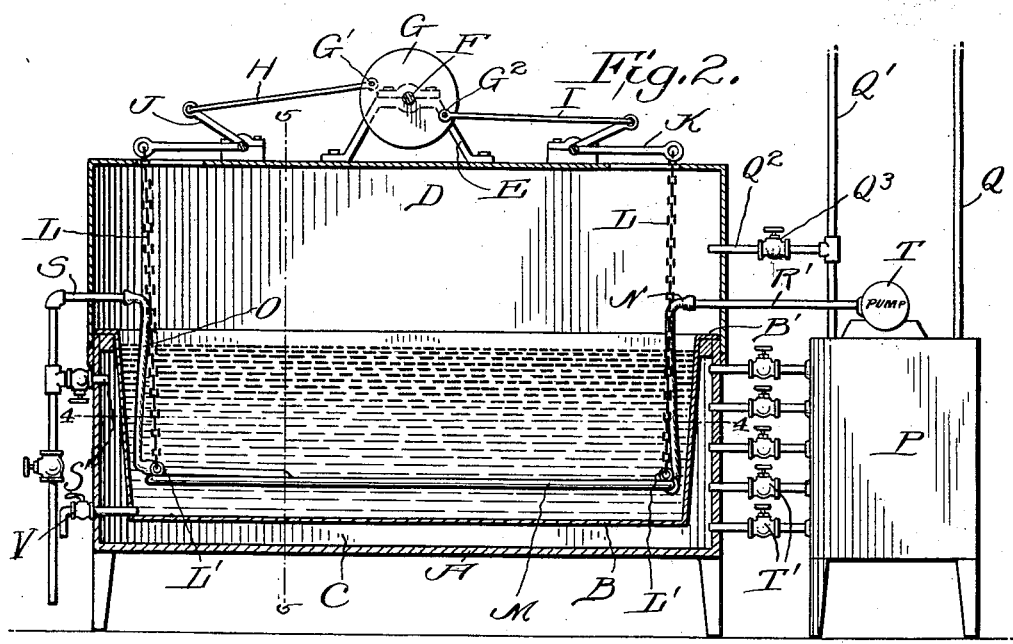
Witnesses
Oliver W. Holmes
Inventor
George Sinclair
By Chas. E. Brock
Attorney G. SINCLAIR.
APPARATUS FOR HEATING AND COOLING LIQUIDS.
APPLICATION FILED APR. 18, 1911.

1,017,816.

Patented Feb. 20, 1912.

2 SHEETS—SHEET 2.

Witnesses
Oliver W. Holmes

Inventor
George Sinclair
By
Attorney

UNITED STATES PATENT OFFICE.

GEORGE SINCLAIR, OF GREENWICH, OHIO.

APPARATUS FOR HEATING AND COOLING LIQUIDS.

1,017,816.  Specification of Letters Patent.  Patented Feb. 20, 1912.

Application filed April 18, 1911. Serial No. 621,806.

*To all whom it may concern:*

Be it known that I, GEORGE SINCLAIR, a citizen of the United States, residing at Greenwich, in the county of Huron and State of Ohio, have invented a new and useful Improvement in Apparatus for Heating and Cooling Liquids, of which the following is a specification.

This invention relates to an apparatus for heating and cooling liquids especially adapted to be used in creameries, the object being to provide an apparatus which is so constructed that liquid can be quickly heated in order to pasteurize the same, or cooled.

Another object of my invention is to provide an apparatus which can be quickly installed and used in connection with the ordinary milk vat now in use in creameries and the like, whereby the expense in installing the apparatus will be very small.

Another object of my invention is to provide novel means for raising and lowering the coil used for heating or cooling the milk, whereby the same can be submerged within the milk at any depth desired, and at the same time can be used as an agitator.

Another object of my invention is to provide a tank in connection with the vat having a pump for supplying cooling or heating liquid to the coil and vat.

A still further object of my invention is to provide means for connecting the vat or heating chamber of the same to the tank, whereby the liquid from the coil is forced into the chamber and from there is led back into the tank.

With these objects in view, the invention consists in the novel features of construction, combination and arrangement of parts, hereinafter fully described and pointed out in the claims.

Figure 3:
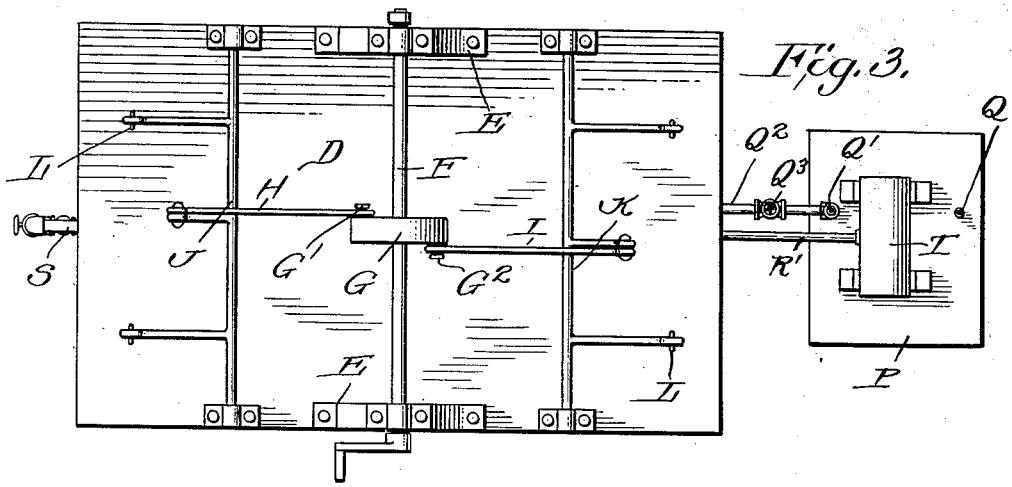
Figure 4:
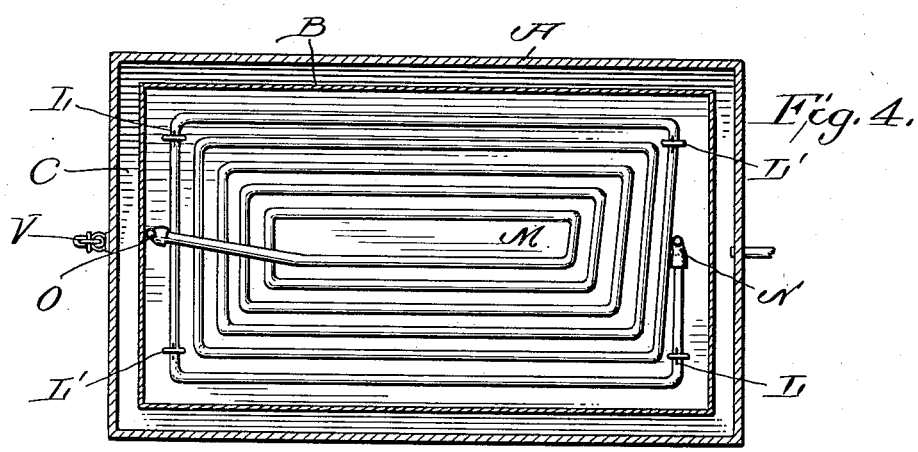
Figure 5:
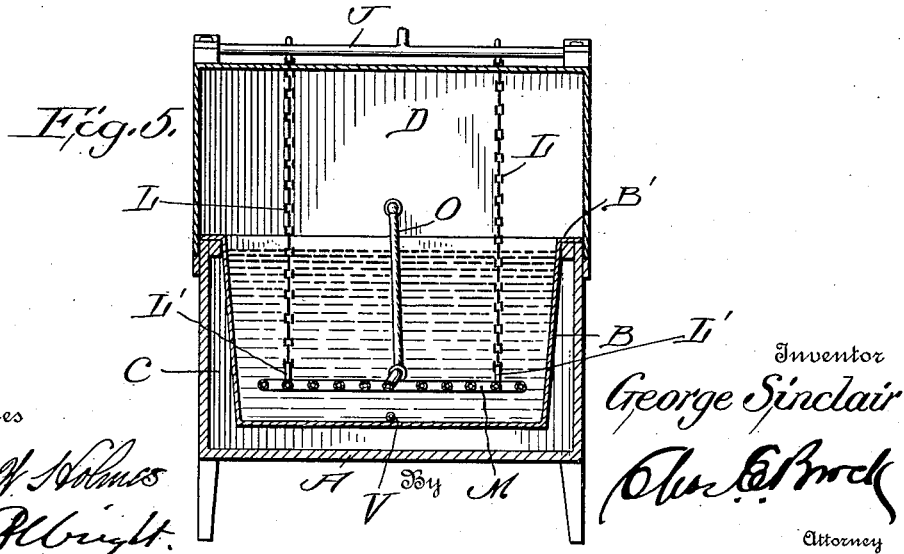

In the drawing forming a part of this specification:—Figure 1 is a side elevation of my improved apparatus for heating and cooling liquids, showing the coil adjusted within the vat in position to cool the liquid therein. Fig. 2 is a vertical longitudinal section through the vat showing the coil in position to heat the liquid. Fig. 3 is a top plan view. Fig. 4 is a horizontal section taken on line 4—4 of Fig. 2. Fig. 5 is a section taken on line 5—5 of Fig. 2.

In carrying out my improved invention, I employ a vat A of the ordinary construction, in which is placed a vessel B supported therein by a flange B' formed on the outer edge and spaced from the inner wall of the vat so as to form a chamber C into which the heating or cooling liquid is adapted to be forced as will be later described.

Arranged over the vat is a cover D which completely incloses the same, and is supported in position thereon by bars secured to the side of the vat, whereby the cover can be easily and quickly removed. Mounted on the cover are bearings E carrying a crank shaft F which is provided with a disk G having wrist pins G' G² to which are connected links H and I which have their free ends connected to crank arms J and K of crank shafts mounted in suitable bearings mounted upon the cover. The other arms of the crank shafts J and K carry chains L which are connected to eyes L' of a coil M which is substantially of the same shape as the vessel B, and is provided with an inlet at one end to which is connected a flexible pipe N, and an outlet at its other end to which is connected a flexible pipe O as clearly shown.

Arranged to one side of the vat is a tank P which is provided with a steam inlet pipe Q and an outlet pipe Q', and said pipes are preferably connected to a coil not shown mounted within the tank P, whereby the liquid within the tank can be heated. The outlet pipe Q' is provided with a branch pipe Q² extending into the cover, whereby steam can be admitted into the vat in order to increase the temperature if desired, and said pipe is provided with a cut off valve Q³.

Mounted on the tank is a pump T provided with a pipe R' which is connected to the flexible pipe N for forcing the heating or cooling liquid through the coil as the case may be. The flexible pipe O is connected to a pipe S which is provided with a branch S' extending into the chamber C, whereby the cooling or heating liquid after passing through the coil will be forced into the chamber so as to heat the same, and said branch pipe is provided with a valve for controlling the same in order to cut off the flow of liquid within the chamber when it is desired. A series of valve controlled return pipes T' connect the vat with the tank P, whereby the liquid after passing into the chamber C will be led back into the tank to be heated or cooled again as the case may be. The pipes Q and Q' may be used for conveying a cooling liquid instead of steam so as to cool the liquid within the tank.

From the foregoing description, it will be seen that by constructing an apparatus in this manner the cooling or heating coil can be raised and lowered so as to agitate the milk within the vessel B. It also can be adjusted and held in that position, whereby better results can be obtained by placing the coil at the upper portion of the tank when used for cooling purposes, and at the lower portion when used for heating purposes.

I have shown at V a valve controlled drain pipe which leads from the inner vessel through the sides of the vat A, so that the vessel B can be drained of its liquid contents.

What I claim is:—

1. An apparatus of the kind described, comprising a vat having a removable cover, a crank shaft mounted on said cover carrying a disk, crank shafts mounted on each side of the first mentioned crank shaft connected to said disk by links, chains carried by said last mentioned crank shafts, a coil carried by said chains, and a tank having a pump for forcing liquid through said coil.

2. An apparatus of the kind described comprising a vat having a vessel supported therein and spaced there-from to form a chamber, a cover arranged over said chamber, chains carried by said cover, a coil supported by said chains within said vessel, pipes extending through said cover, flexible pipes connecting said pipes to said coil, one of said pipes being provided with a branch extending into said chamber, and a pump connected to the other pipe for forcing liquid through said coil and chamber.

GEORGE SINCLAIR.

Witnesses:
W. B. McCullow,
D. C. Reynolds.

---

Copies of this patent may be obtained for five cents each, by addressing the "Commissioner of Patents, Washington, D. C."